United States Patent [19]
Vargas et al.

[11] Patent Number: 6,011,969
[45] Date of Patent: Jan. 4, 2000

[54] TCAP PACKAGE TYPE SPECIFICATION FOR ANSI-41 MAP MESSAGES IN ORDER TO SUPPORT MAP OPERATION CLOSURE

[75] Inventors: Marco Antonio Hurtado Vargas, Coahuila, Mexico; Margaret Britt, Montreal, Canada

[73] Assignee: Telefonaktiebolaget L M Ericsson, Stockholm, Sweden

[21] Appl. No.: 09/088,984

[22] Filed: Jun. 2, 1998

Related U.S. Application Data

[60] Provisional application No. 60/049,629, Jun. 13, 1997.
[51] Int. Cl.[7] ..................................... H04Q 7/34
[52] U.S. Cl. ..................... 455/423; 455/433; 455/445; 455/67.1
[58] Field of Search ................................ 455/423–424, 455/433, 435, 445, 466, 67.1, 560, 8–9, 461; 379/221, 207, 229, 230; 370/401, 216, 400

[56] References Cited

U.S. PATENT DOCUMENTS

| | | | |
|---|---|---|---|
| 5,396,543 | 3/1995 | Beeson, Jr. et al. | 455/560 |
| 5,537,594 | 7/1996 | Shannon et al. | 364/DIG. 1 |
| 5,629,974 | 5/1997 | Rajala et al. | 455/466 |
| 5,864,761 | 1/1999 | Choi | 455/461 |

*Primary Examiner*—Doris H. To
*Attorney, Agent, or Firm*—Jenkens & Gilchrist

[57] ABSTRACT

The package type identifier of "conversation with permission" is utilized in certain ANSI-41 Mobile Application Part (MAP) messages to allow a node receiving the message to generate an appropriate response message necessary for MAP operation closure within a Transaction Capability Application Part (TCAP) transaction. In one implementation, an ANSI-41 MAP error or reject message includes a package type identifier of "conversation with permission" instead of "response" thus allowing the node receiving the error or reject message to appropriately respond in connection with the closure of an open MAP operation. In another implementation, the "conversation with permission" package type identifier is specified for an ANSI-41 MAP instruction request message to support MAP operation closure in the event of an error or rejection in that operation.

12 Claims, 3 Drawing Sheets

TCAP PACKAGE TYPE SPECIFICATION FOR ANSI-41 MAP MESSAGES IN ORDER TO SUPPORT MAP OPERATION CLOSURE

CROSS REFERENCE TO RELATED APPLICATION

The present application for patent is related to, and claims priority from, co-pending U.S. Provisional Application for Patent Ser. No. 60/049,629, filed Jun. 13, 1997, entitled "Handling RUIDIR Message in HLR-MSC Interaction" by Marco Vargas and Margaret Britt. The disclosure of U.S. Provisional Application for Patent Ser. No. 60/049,629 is hereby incorporated by reference.

BACKGROUND OF THE INVENTION

1. Technical Field of the Invention

The present invention relates to communications systems and, in particular, to the specification of Transaction Capability Application Part (TCAP) package types for ANSI-41 messages in order to support the closure of open Mobile Application Part (MAP) operations.

2. Description of Related Art

Reference is now made to FIG. 1 wherein there is shown a signal flow and nodal operation diagram illustrating prior art ANSI-41 messaging sharing the same Transaction Capability Application Part (TCAP) transaction identifier. This illustrated example of shared TCAP transaction identifier ANSI-41 messaging relates to the use of the remote user interaction directive (RUIDIR) message in connection with the implementation of a password call acceptance (PCA) service feature. An incoming call 100 dialed to the directory number of a certain mobile station (not shown) is received at an originating (gateway) mobile switching center (MSC) 102 within a mobile (cellular) communications network. Responsive to the received call, the originating mobile switching center 102 sends an ANSI-41 MAP location request (LOCREQ) message 104 to a home location register (HLR) 106 for that called mobile station, and starts a LOCREQ timer. This location request message 104 initiates a TCAP transaction 108, and includes a package type identifier of "query with permission". Responsive to the location request message 104, the home location register 106 determines (action 110) from the stored service profile for the called mobile station that the password call acceptance (PCA) service feature is active, and starts a user interactive session. A MAP remote user interaction directive (RUIDIR) message 112 is accordingly sent by the home location register 106 back to the originating mobile switching center 102. This remote user interaction directive message 112 is included as part of the same TCAP transaction 108, and includes a package type identifier of "conversation without permissions. On receipt of the remote user interaction directive message 112, the originating mobile switching center 102 turns off the LOCREQ timer and provides the call treatment as indicated in the remote user interaction directive message. For the password call acceptance service feature this treatment includes prompting 114 and 116 the calling party (not shown) in accordance with the remote user interaction directive message 112, and waiting for the calling party to enter password digits. The calling party then responds with password digits 118. The originating mobile switching center 102 then sends a remote user interaction directive return message (ruidir) 120 containing the entered password digits back to the home location register 106. This remote user interaction directive return message 120 is included as part of the same TCAP transaction 108, and includes a package type identifier of "conversation with permission". The home location register 106 then compares (action 122) the entered password digits against a screening list. In this particular example, it is assumed that the entered password digits do not match an entry on the screening list. This means that the incoming call 100 is not to be allowed to proceed to completion. Instead, the incoming call 100 is to be forwarded to a voice mail system. The home location register 106 then sends a location request return result message (locreq) 124, including a directory number for the voice mail system, back to the originating mobile switching center 102. This location request return result message 124 is included as part of the same TCAP transaction 108, and includes a package type identifier of "response". The originating mobile switching center 102 then provides call treatment (action 126) to the incoming call 100 in accordance with the instructions contained in the location request return result message 124. Treatment in this case may include the provision of an announcement indicating that an incorrect password was provided. The incoming call 100 is then forwarded 128 to the voice mail system 130. It is noted that in the foregoing calling scenario, both of the LOCREQ and RUIDIR MAP operations were successfully completed by the end of the TCAP transaction 108.

Reference is now made to FIG. 2 wherein there is shown a signal flow and nodal operation diagram illustrating prior art ANSI-41 messaging wherein a location request operation is not completed within a shared (nested) TCAP transaction. Again, this illustrated example presents call handling in connection with the implementation of a password call acceptance service feature. An incoming call 100 dialed to the directory number of a certain mobile station (not shown) is received at an originating (gateway) mobile switching center 102 within a mobile (cellular) communications network. Responsive to the received call, the originating mobile switching center 102 sends an ANSI-41 MAP location request (LOCREQ) message 104 to a home location register 106 for that called mobile station, and starts a LOCREQ timer. This location request message 104 initiates a TCAP transaction 108, and includes a package type identifier of "query with permission". Responsive to the location request message 104, the home location register 106 determines (action 110) from the stored service profile for the called mobile station that the password call acceptance (PCA) service feature is active, and starts a user interactive session. A MAP remote user interaction directive (RUIDIR) message 112 is accordingly sent by the home location register 106 back to the originating mobile switching center 102. This remote user interaction directive message 112 is included as part of the same TCAP transaction 108, and includes a package type identifier of "conversation without permission". On receipt of the remote user interaction directive message 112, the originating mobile switching center 102 turns off the LOCREQ timer and a problem (event 132) is thereafter detected. This problem may involve, for example, a resource shortage or a parameter error. Due to this problem, the remote user interaction directive message 112 cannot be processed. The originating mobile switching center 102 then sends a remote user interaction directive return error (or reject) message (ruidir error) 134 back to the home location register 106. This remote user interaction directive return error message 134 is included as part of the same TCAP transaction 108, and includes a package type identifier of "response". In this scenario, the specified package type identifier of "response" for the remote user interaction directive return error message 134 causes a premature termination of the TCAP transaction 108 without the home location register 106 providing an answer to the location request message 104 (i.e., no closure of the LOCREQ MAP operation). It should be recognized here that a response is not a valid reply to a conversation without permission package type. The originating mobile switching center 102 is accordingly not able to properly handle or redirect the incoming call 100 (for example, to the voice mail system 130 as in FIG. 1). Action may eventually be taken by the originating mobile switching center 102 as time supervision for the LOCREQ operation expires, but none of these possible actions depend on information provided by the home location register 106. There is a need for a mechanism to support LOCREQ MAP operation closure and allow the home location register to provide an answer.

Reference is now made to FIG. 3 wherein there is shown a signal flow and nodal operation diagram illustrating prior art ANSI-41 messaging wherein an instruction request operation is not completed within a shared (sequential) TCAP transaction. A mobile switching center 200 sends a MAP origination request (ORREQ) message 202 to a service control function (SCF) 204. Responsive to the origination request message 202, the service control function 204 sends a MAP seize resource (SEIZRES) message 206 to an intelligent peripheral (IP) 208. This seize resource message 206 initiates a TCAP transaction 210, and includes a package type identifier of "query with permission". Responsive to the seize resource message 206, the intelligent peripheral 208 seizes (action 212) the appropriate resources and sends a seize resource return result message (seizres) 214 back the service control function 204. This seize resource return result message 214 is included as part of the same TCAP transaction 210, and includes a package type identifier of "conversation without permission". A MAP connect resource (CONNRES) message 216 is then sent from the service control function 204 to the mobile switching center 200, and a connection 218 is set-up between the mobile switching center and the intelligent peripheral 208. The intelligent peripheral 208 next sends a MAP instruction request (INSTREQ) message 220 to the service control function 204. This instruction request message 220 is included as part of the same TCAP transaction 210, and includes a package type identifier of "conversation without permission". On receipt of the instruction request message 220, the service control function 204 detects a problem (event 222). This problem may involve, for example, a resource shortage or a parameter error. Due to this problem, the instruction request message 220 cannot be processed. Furthermore, because the instruction request message 220 includes a package type identifier of conversation without permission", the service control function 204 is not permitted to send an instruction request return error (or reject) message (instreq error) with a proper ANSI-41 package type back to the intelligent peripheral 208. In this scenario, the specified package type identifier of "conversation without permission" for the instruction request message 220 prevents the service control function 204 from being able to properly terminate (i.e., close) the INSTREQ MAP operation. There is a need for a mechanism to support INSTREQ operation closure and allow the service control facility to answer.

More generally, there is a need in situations where a TCAP transaction with nested MAP operations is instigated to not only allow for the closure of the outer MAP operation, but also allow a node implicated by the nested operations to respond with a final instruction in situations where inner MAP operation messaging is unsuccessful. Furthermore, there is a need in situations where a TCAP transaction with sequential MAP operations is instigated to allow for the closure of each MAP operation, and allow a node implicated by the sequential operations to respond with a final instruction when MAP operation messaging is unsuccessful.

SUMMARY OF THE INVENTION

The present invention solves the foregoing problems concerning closure of nested and sequential Mobile Application Part (MAP) operations within a single Transaction Capability Application Part (TCAP) transaction by modifying a package type identifier specified for certain ANSI-41 MAP messages to not only support the closure of the MAP operation, but also to allow an implicated node to send necessary instructions where MAP operation messaging is unsuccessful. To accomplish this goal, package type identifier of certain ANSI-41 MAP messages is specified as "conversation with permission". The node receiving the message is accordingly given permission to generate an appropriate response message and effectuate the graceful closure of the failed MAP operation. The certain messages may comprise, for example, a service invoking message (such as a LOCREQ or FEATREQ) or a service instruction message (such as a RUIDIR).

More specifically, in one implementation an ANSI-41 error or reject message is modified to include a package type identifier of "conversation with permission" instead of "response" thus allowing the node receiving the error or reject message to appropriately respond in connection with the closure of a TCAP transaction containing nested MAP operations. For example, with respect to an inner remote user interactive directive (RUIDIR) MAP operation, its corresponding error or reject response message includes the "conversation with permission" package type identifier so that an outer MAP operation (such as a location request (LOCREQ)) may be closed. In another implementation, the "conversation with permission" package type identifier (instead of "conversation without permission") is specified for a modified ANSI-41 MAP instruction request (INSTREQ) message in a TCAP transaction with sequential MAP operations in order to support MAP operation closure in the event of an error or rejection in that operation.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
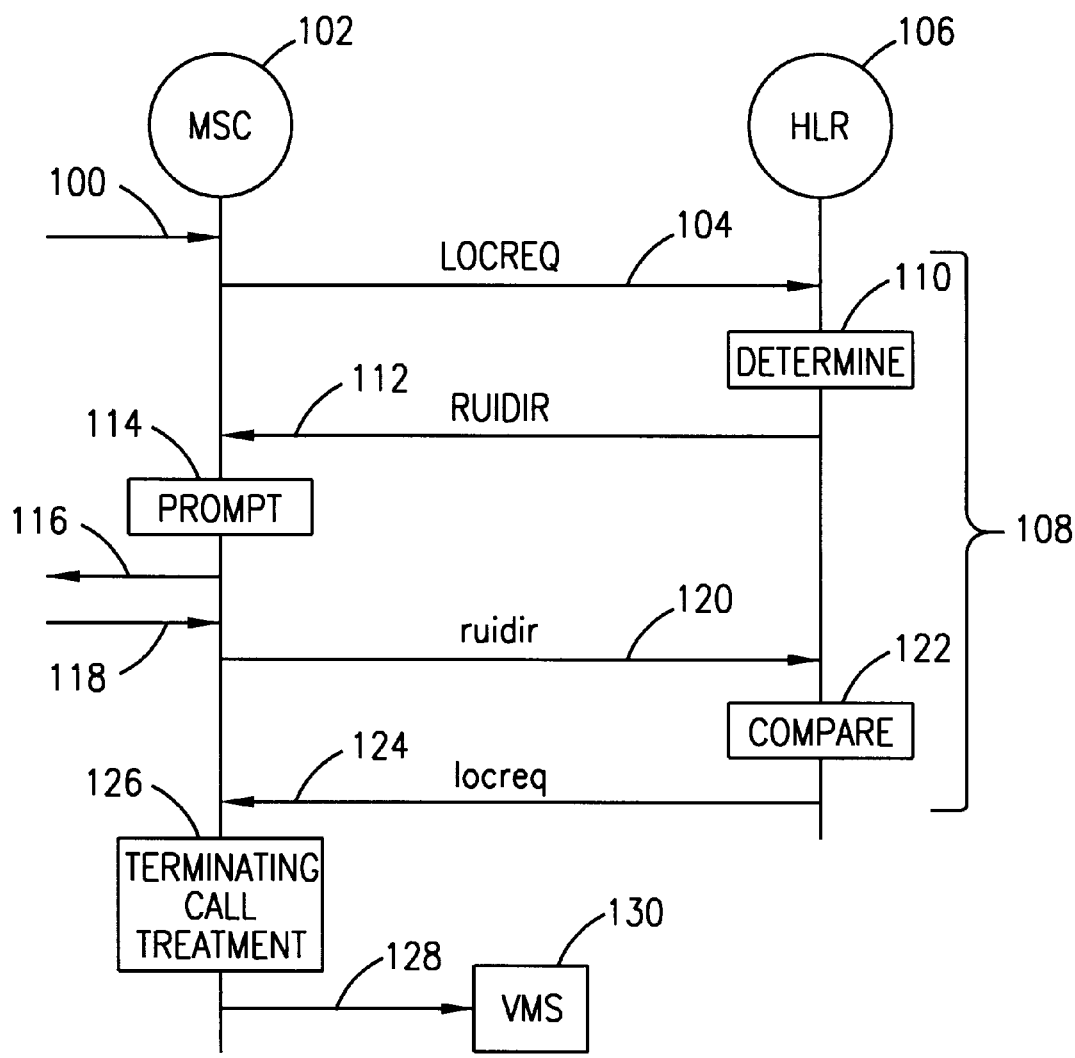
FIG. 1, previously described, is a signal flow and nodal operation diagram illustrating prior art ANSI-41 nested MAP messaging sharing the same TCAP transaction identifier.
Figure 2:
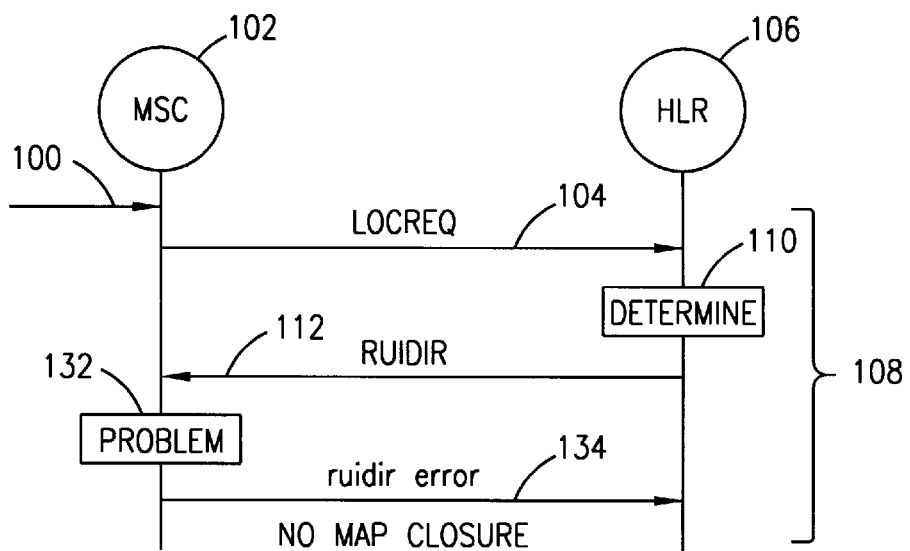
FIG. 2, previously described, is a signal flow and nodal operation diagram illustrating prior art ANSI-41 nested MAP messaging wherein a location request operation is not completed within a shared TCAP transaction.
Figure 4:
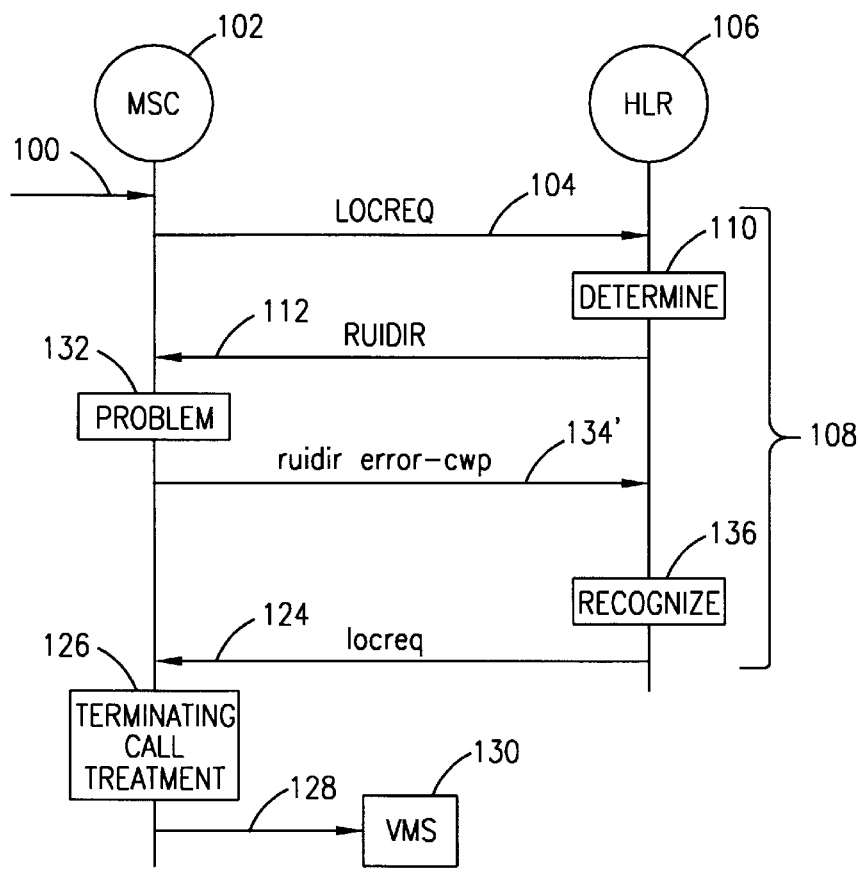
FIG. 4 is a signal flow and nodal operation diagram illustrating present invention ANSI-41 nested MAP messaging sharing the same TCAP transaction identifier and supporting MAP operation closure with respect to the location request operation.

Reference is now made to FIG. 4 wherein there is shown a signal flow and nodal operation diagram illustrating present invention ANSI-41 nested MAP messaging sharing the same TCAP transaction identifier and supporting MAP operation closure with respect to the location request operation. This illustrated example of shared TCAP transaction identifier ANSI-41 MAP messaging relates to the use of the remote user interaction directive (RUIDIR) message in connection with the implementation of a password call acceptance (PCA) service feature. An incoming call 100 dialed to the directory number of a certain mobile station (not shown) is received at an originating (gateway) mobile switching center 102 within a mobile (cellular) communications network. Responsive to the received call, the originating mobile switching center 102 sends an ANSI-41 MAP location request (LOCREQ) message 104 to a home location register 106 for that called mobile station, and starts a LOCREQ timer. This location request message 104 initiates a TCAP transaction 108, and includes a package type identifier of "query with permission". Responsive to the location request message 104, the home location register 106 determines (action 110) from the stored service profile for the called mobile station that the password call acceptance (PCA) service feature is active, and starts a user interactive session. A MAP remote user interaction directive (RUIDIR) message 112 is accordingly sent by the home location register 106 back to the originating mobile switching center 102. This remote user interaction directive message 112 is included as part of the same TCAP transaction 108, and includes a package type identifier of a "conversation without permission". On receipt of the remote user interaction directive message 112, the originating mobile switching center 102 turns off the LOCREQ timer and a problem (event 132) is thereafter detected. This problem may involve, for example, a resource shortage or a parameter error. Due to this problem, the remote user interaction directive message 112 cannot be processed. The originating mobile switching center 102 then sends a remote user interaction directive return error (or reject) message (ruidir error) 134' back to the home location register 106. This remote user interaction directive return error message 134' is included as part of the same TCAP transaction 108, and includes a package type identifier of "conversation with permission" (cwp) instead of the package type identifier of "response" as with the message 134 of FIG. 2. In this scenario, the specified package type identifier of "conversation with permission" for the remote user interaction directive return error message 134', as with the remote user interaction directive return message 120 of FIG. 1, permits continued processing of the TCAP transaction 108, and allows the home location register 106 to provide an answer to the location request message 104. Responsive to the remote user interaction directive return error message 134', the home location register 106 recognizes (action 136) that the incoming call 100 is not to be allowed to proceed to completion. Instead, the incoming call 100 is to be forwarded to a voice mail system. The home location register 106 then sends a location request return result message (locreq) 124, including a directory number for the voice mail system, back to the originating mobile switching center 102. This location request return result message 124 is included as part of the same TCAP transaction 108, and includes a package type identifier of "response". The originating mobile switching center 102 then provides call treatment (action 126) to the incoming call 100 in accordance with the instructions contained in the location request return result message 124. Treatment in this case may include the provision of an announcement indicating that an incorrect password was provided. The incoming call 100 is then forwarded 128 to the voice mail system 130. It is noted that in the foregoing calling scenario of the present invention, both of the LOCREQ and RUIDIR MAP operations were successfully completed by the end of the TCAP transaction 108, even though the RUIDIR operation implicated an ANSI-41 return error or reject message. It is further recognized that the solution of the present invention also supports MAP operation closure in connection with a remote user interactive directive operation initiated by transactions other than a location request (such as a feature request (FEATREQ) with its answer (featreq) or an origination request (ORREQ) with its answer (orreq)).

Figure 3:
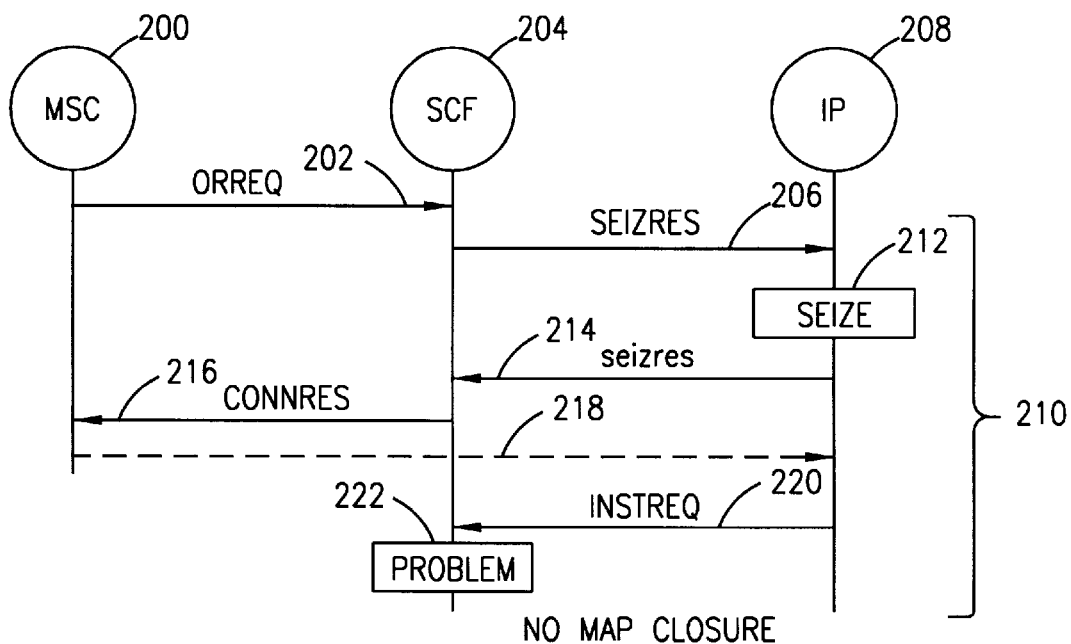
FIG. 3, previously described, is a signal flow and nodal operation diagram illustrating prior art ANSI-41 sequential MAP messaging wherein an instruction request operation is not completed within a shared TCAP transaction.
Figure 5:
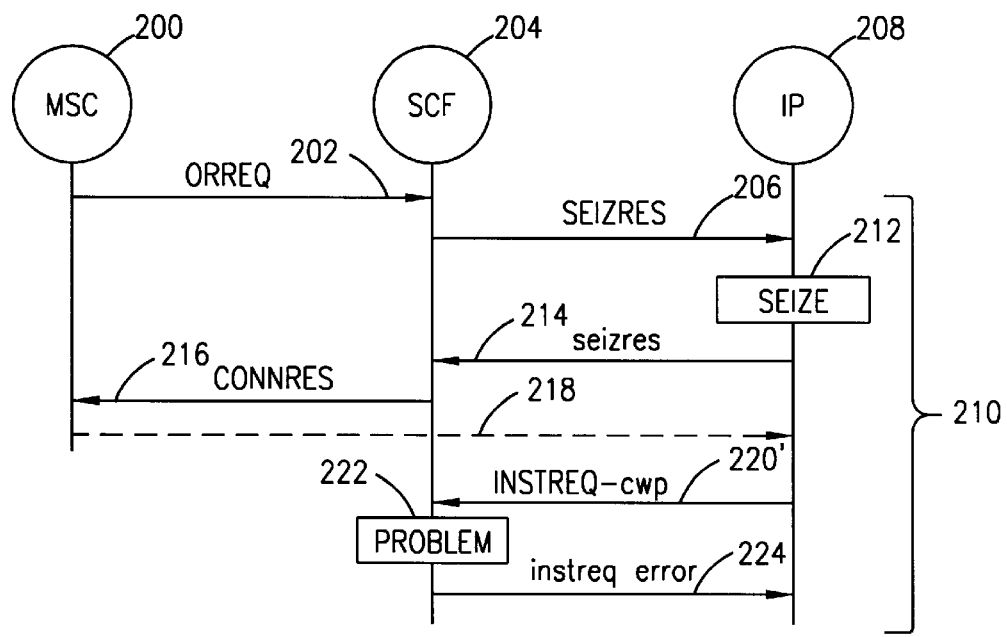
FIG. 5 is a signal flow and nodal operation diagram illustrating present invention ANSI-41 sequential MAP messaging sharing the same TCAP transaction identifier and supporting MAP operation closure with respect to the instruction request operation.

Reference is now made to FIG. 5 wherein there is shown a signal flow and nodal operation diagram illustrating present invention ANSI-41 MAP messaging sharing the same TCAP transaction identifier and supporting MAP operation closure with respect to the instruction request operation. A mobile switching center 200 sends a MAP origination request (ORREQ) message 202 to a service control function (SCF) 204 (or other processing node such as a service node (SN) or a home location register (HLR)). Responsive to the origination request message 202, the service control function 204 sends a MAP seize resource (SEIZRES) message 206 to an intelligent peripheral (IP) 208. This seize resource message 206 initiates a TCAP transaction 210, and includes a package type identifier of "query with permission". Responsive to the seize resource message 206, the intelligent peripheral 208 seizes (action 212) the appropriate resources and sends a seize resource return result message (seizres) 214 back the service control function 204. This seize resource return result message 214 is included as part of the same TCAP transaction 210, and includes a package type identifier of "conversation without permission". A MAP connect resource (CONNRES) message 216 is then sent from the service control function 204 to the mobile switching center 200, and a connection 218 is set-up between the mobile switching center and the intelligent peripheral 208. The intelligent peripheral 208 next sends a MAP instruction request (INSTREQ) message 220' to the service control function 204. This instruction request message 220 is included as part of the same TCAP transaction 210, and includes a package type identifier of "conversation with permission" (cwp) instead of the package type identifier of "conversation without permission" as with the message 220 of FIG. 3. In this scenario, the specified package type identifier of "conversation with permission" for the instruction request message 220' allows the service control function 204 to continue processing the TCAP transaction 210 (see below). On receipt of the instruction request message 220', the service control function 204 detects a problem (event 222). This problem may involve, for example, a resource shortage or a parameter error. Due to this problem, the instruction request message 220' cannot be processed. However, the package type identifier of "conversation with permission" for the instruction request message 220' allows the service control function 204 to send an instruction request return error (or reject) message (instreq error) 224 back to the intelligent peripheral 208. This instruction request return error message 224 is included as part of the same TCAP transaction 210, and includes a package type identifier of "response". It is noted that in the foregoing calling scenario of the present invention, the ORREQ/INSTREQ operation is successfully completed by the end of the TCAP transaction 210, even though an ANSI-41 return error or reject message 224 was implicated.

While specific examples of operation of the present invention relating to LOCREQ, ORREQ and FEATREQ ANSI-41 messages have been disclosed, it should be understood that similar package type modifications supporting MAP operation closure may be made to other ANSI-41 messages including, for example, transfer to number request (TRANUMREQ), analyzed information (ANLYZD), facility selected and available (FAVAIL), service request (SERVREQ), transfer busy (TBUSY) and transfer no answer (TNOANSWER).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for supporting the closure of (MAP) Mobile Application Part operations within a shared Transaction Capability Application Part (TCAP) transaction in the event of an error or reject, comprising the steps of:

sending a first MAP message from a first node to a second node, the first message initiating the TCAP transaction;

sending a second MAP message from the second node to the first node within the same TCAP transaction, the second message sent in response to the first message;

experiencing at the first node a problem preventing processing of the second MAP message;

sending a second MAP message answer from the first node to the second node, the second MAP message answer sent in response to the experienced problem and including a package type of "conversation with permission"; and sending a first MAP message answer from the second node to the first node, the first MAP message answer sent in response to the second MAP message answer and closing each MAP operation and the open TCAP transaction.

2. The method as in claim 1 wherein:

the first node comprises a mobile switching center of a telecommunications network; and the second node comprises a home location register of that telecommunications network.

3. The method as in claim 2 wherein:

the second MAP message comprises a remote user interaction directive (RUIDIR) message; and the second MAP message answer comprises a remote user interaction directive (ruidir) reject or error return result message including the package type of "conversation with permission".

4. The method as in claim 3 wherein:

the first MAP message comprises a location request (LOCREQ) message; and the first MAP message answer a location request (locreq) return result message.

5. The method as in claim 3 wherein:

the first MAP message comprises an origination request (ORREQ) message; and the first MAP message answer comprises an origination request (orreq) return result message.

6. The method as in claim 3 wherein:

the first MAP message comprises a feature request (FEATREQ) message; and the first MAP message answer comprises a feature request (featreq) return result message.

7. A method for supporting the closure of Mobile Application Part (MAP) operations within a shared Transaction Capability Application Part (TCAP) transaction in the event of an error or reject, comprising the steps of:

sending a MAP message from a first node to a second node, the MAP message sent within an existing open TCAP transaction and including a package type of "conversation with permission";

experiencing at the second node a problem preventing processing of the MAP message;

sending a MAP message answer from the first node to the second node, the MAP message answer sent in response to the experienced problem and closing the open TCAP transaction and MAP operation.

8. The method as in claim 7 wherein:

the first node comprises an intelligent peripheral within a telecommunications network; and the second node comprises a service control function within that telecommunications network.

9. The method as in claim 8 wherein:

the MAP message comprises an instruction request (INSTREQ) message including the package type of "conversation with permission"; and the MAP message answer comprises an instruction request (instreq) reject or error return result message.

10. In connection with the handling of nested Mobile Application Part (MAP) operations within a Transaction Capability Application Part (TCAP) transaction including an outer MAP operation and an inner MAP operation, a method comprising the steps of:

specifying in a first MAP message relating a reject or error return result and comprising part of the inner MAP operation a package type of "conversation with permission";

responding to the permission granted by the first MAP message with a second MAP message effectuating a graceful closure of the outer MAP operation.

11. The method of claim 10 wherein the first MAP message comprises a service invoking message.

12. The method of claim 10 wherein the first MAP message comprises a service instruction message.

* * * * *